United States Patent Office 3,297,656
Patented Jan. 10, 1967

3,297,656
POLYAMIDES FROM N,N'-DIPHENYLDIAMINES
John R. Caldwell, Kingsport, Tenn., assignor to Eastman Kodak Company, Rochester, N.Y., a corporation of New Jersey
No Drawing. Filed Oct. 11, 1965, Ser. No. 494,906
8 Claims. (Cl. 260—78)

This is a continuation-in-part of our copending application, Serial No. 102,667 filed April 13, 1961, now abandoned.

This invention relates to the manufacture of new high-molecular-weight linear polyamides. It is particularly concerned with the preparation of polyamides from N,N'-diphenyldiamines.

An object of the invention is to provide new polyamides that have exceptionally high thermal stability. Another object of the invention is to provide now polyamides that have a high elastic modulus. A further object of the invention is to provide polyamides that are suitable for the manufacture of fibers, films and molded objects.

The objects of the invention are accomplished by treating N,N'-diphenyldiamines with dicarboxylic acids or suitable dicarboxylic derivatives. The polyamides of the invention are especially valuable for the production of tire cords.

These novel and valuable polyamides have other utility of more general value as well known in the art, as for molding plastics, synthetic fabrics, coating compositions, film, tapes, tubing, rods, bristles, etc. Their use as tire cord merely illustrates an application taking advantage of their exceptional high temperature and high modulus properties.

The polyamides of the present invention do not contain any hydrogen atoms on the nitrogen. According to the teachings of the prior art, such polyamides should be low-melting because there is no hydrogen bonding at the nitrogen atom [see I. Eng. Chem., 40, 875 (1948) and J. Am. Chem. Soc., 65, 1120 (1943)]. Therefore, it was very surprising to find that the polyamides of the present invention have relatively high melting points.

See also Hill, "Fibers From Synthetic Polymers," Elsevier Publishing Company, 1953, pages 139–140 and 316–320, wherein the effects of progressively greater N-alkylation are said to result in gradual disappearance of properties such as toughness, hardness, high melting point, high strength of oriented fibers, etc. It is indicated that this is due to reduction in interchain forces.

A more recent reference, J. Poly. Science, 40, 343 (1959), teaches that N-substitution, in general, lowers the melting point. On page 350 is contained the statement that there is a "marked decrease [in melting point] when internal hydrogen bonding is removed and this melting point is further depressed as the length of the N-alkyl substituent is increased." This paper gives the melting points for several polyamides that contain N-alkyl groups. The polymer made from ethylenediamine and terephthaloyl chloride melts at 455° whereas the same polymer made from N,N'-dibutylethylenediamine melts at 190°.

The prior art teaches that those who would seek improved polymers exhibiting high melting points should avoid trying N-alkyl substituents on the diamine constituent of polyamides, and in addition that melting point varies, in an inverse manner from changes in the length of the N-alkyl substituent. Thus, it would reasonably be predicted that a phenyl group would depress the melting point more than a butyl group, since the phenyl group is larger. Rather, it was discovered that the polymer described in Example 1 of the present application, instead of melting below 190°, as would be expected in view of the prior art, melts at above 350°.

In the light of the prior art as discussed, the present invention represents a most unobvious discovery; a highly polymeric linear polyamide melting above about 150° C. and having an inherent viscosity of at least 0.4, being a polyamide of (1) at least one bifunctional dicarboxylic acid constituent selected from the group consisting of aromatic acids having from 8 to 20 carbon atoms and having their carboxyl radicals attached to a benzene ring, aliphatic acids having from 2 to 10 carbon atoms in a straight chain, symmetrical branched chain aliphatic acids having from 5 to 8 carbon atoms, and alicyclic acids having from 8 to 30 carbon atoms, and (2) at least one bifunctional diamine constituent of which at least 50 mole percent is an N,N' diaryl diamine having the following formula:

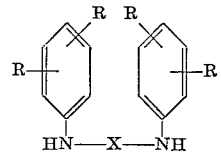

wherein each R represents a member selected from the group consisting of a hydrogen atom, an alkyl radical having from 1 to 4 carbon atoms and a chlorine atom, said R substituents being attached to any available nuclear carbon atom of the benzene rings, and X is a bivalent organic radical having from 2 to 30 carbon atoms.

These polyamides are more particularly those wherein X represents a member selected from the group consisting of —(CH$_2$)$_n$— where $n$ is from 2 to 6
—(CH$_2$)$_m$—O—(CH$_2$)$_m$— where $m$ is from 2 to 3
—(CH$_2$)$_2$—O—(CH$_2$)$_2$—O—(CH$_2$)$_2$—

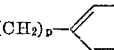

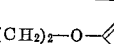

—(CH$_2$)$_2$—O—⟨ ⟩—C(CH$_3$)$_2$—⟨ ⟩—O—(CH$_2$)$_2$—

These polyamides preferably are those wherein the acid is selected from the group consisting of aliphatic acids having from 2 to 30 carbon atoms and nuclearly attached dicarboxylic aromatic acids having from 8 to 20 carbon atoms.

It is preferred that the acid constituent be selected from the group consisting of aromatic acids having from 8 to 20 carbon atoms and having their carboxyl radicals attached to a benzene ring, aliphatic acids having from 2 to 10 carbon atoms in a straight chain, symmetrical branched chain aliphatic acids having from 5 to 8 carbon atoms, and alicyclic acids having from 8 to 30 carbon atoms. These acid constituents generally result in polyamides having melting points above about 150° C. Moreover, the N,N'-diaryldiamine given in the above formula should preferably constitute at least 50 mole percent of the diamine constituent in order to generally result in polyamides melting at above 150° C.

The diamines used herein may be made by known reactions of dihalides with excess aniline or substituted anilines.

Straight or symmetrical branched chain aliphatic dicarboxylic acids can be used, as represented by oxalic acid, malonic acid, dimethylmalonic acid, succinic acid, glutaric acid, adipic acid, 3,3-dimethyladipic acid, pimelic acid, suberic acid, azelaic acid, sebacic acid, etc. Although longer straight chain acids can be employed, the melting point is adversely affected as well as other properties; the same adverse consequences result from using branched chain acids which are asymmetric or have excessive chain lengths. Alicyclic dicarboxylic acids can be used, as represented by the isomeric cyclohexanedicarboxylic acids, norcamphanedicarboxylic acids, cyclopentane dicarboxylic acids, pinic and pinonic acids, etc. Aromatic dicarboxylic acids can be used, as represented by o-phthalic acid, isophthalic acid, terephthalic acid, halogenated terephthalic acids, 4,4'-methylenedibenzoic acid, 4,4'-sulfonyldibenzoic acid, 1,2-di(4-carboxyphenoxy)ethane, naphthalenedicarboxylic acids, 4,4'-diphenic acid, etc.

The polyamides can be prepared by heating the diamines with the dicarboxylic acids or a suitable derivative such as an alkyl ester or the phenyl ester. A preferred method is based on the reaction between the diamine and the acid chloride in the presence of an acid acceptor such as sodium carbonate, sodium hydroxide or a tertiary amine.

This invention can be further illustrated by the following examples of preferred embodiments although it will be understood that these examples are included merely for purposes of illustration and are not intended to limit the scope of the invention unless otherwise specifically indicated.

*Example 1*

The following materials were placed in a high-speed mixer.

| | |
|---|---|
| Water ml | 200.00 |
| N,N'-diphenylethylenediamine g | 8.48 |
| Sodium carbonate g | 6.36 |
| Sodium lauryl sulfate g | 1.00 |

The mixture was stirred until the diamine was well dispersed, and the following materials were added.

| | |
|---|---|
| Terephthaloyl chloride g | 6.09 |
| Chloroform ml | 100.00 |

The mixture was stirred for 5 minutes. The polymer was coagulated by adding acetone and filtered. The polymer was then stirred with water to wash out salts. The yield was 7.0 g. of polymer having an inherent viscosity of 0.44. It melted above 350° C. The polymer was soluble in a mixture of 60 phenol-40 tetrachloroethane.

*Example 2*

Example 1 was repeated except that 50 ml. of chloroform was added during the initial stirring operation prior to the addition of terephthaloyl chloride. An improved yield of 9.6 g. of polymer was obtained.

*Example 3*

A procedure similar to that described in Example 1 was employed except that the diamine was N,N'-diphenyltetramethylenediamine. The polymer obtained melted at 310°–325° C.

*Example 4*

As set forth in the above-described process, N,N'-diphenylethylenediamine and adipoyl chloride were condensed to give a polymer melting at 245°–260° C.

The above four examples yield polyamides which have valuable utility for high performance under adverse conditions such as for tire cord. These polymers can be melt spun in the usual manner and subjected to drawing, heat treatment, etc. The unusual physical properties of fibers of these polyamides are advantageous for such purposes as tire cord in tires for trucks, buses, earth moving equipment, etc. as well as for passenger cars. These fibers can also be used for yarn woven into fabrics for wearing apparel, filters, laminated fabrics, etc. These polymers can be extruded to form other shaped objects such as film, tubes, tape, etc.

Other polymers can also be made which are useful for synthetic fibers as well as for other purposes.

*Example 5*

The condensation of N,N'-diphenylethylenediame and isophthaloyl chloride gave a polymer melting at 160°–170° C. which is quite high for the isophthalic structure. Usage of mixtures of terephthalic and isophthalic structures in the polymer wherein the former constitutes at least 70 mole percent are especially useful for fibers and film. However, the homopolymer of this example which melts at 160°–170° C. is also useful for such purpose although its preferred utility is as a molding plastic. When molded, high quality objects can be obtained which are transparent.

The following examples provide additional illustrations of polymers melting at above 150° C.

*Example 6*

α,α'-Dichloro-p-xylene was heated with excess aniline to give N,N'-diphenyl-α,α'-p-xylenediamine. Treatment of this diamine with sebacoyl chloride gave a polyamide useful as a molding plastic.

*Example 7*

A polyamide was made from N,N'-diphenylethylenediamine and dimethylmalonyl chloride. It was useful as a molding plastic.

*Example 8*

A copolyamide made from N,N'-diphenylethylenediamine, 50 mole percent isophthaloyl chloride and 50 mole percent suberoyl chloride softened in the range of 180–200° and was useful as a molding plastic.

*Example 9*

A copolyamide made from N,N'-diphenylethylenediamine, 60 mole percent suberoyl chloride and 40 mole percent terephthaloyl chloride softened at 200–215°. It was readily processed into clear, strong films by extrusion through a heated die.

*Example 10*

N,N'-diphenyl-α,α'-p-xylenediamine and the acid chloride of pimelic acid gave a polyamide that melted at 240–255°. It gave clear, tough films.

*Example 11*

N,N'-diphenylhexamethylenediamine was treated with a mixture of 85 mole percent terephthaloyl chloride and 15 mole percent adipoyl chloride. The copolyamide softened at 240–260° and molded readily to give transparent products.

*Example 12*

A copolyamide was made from N,N'-diphenylethylenediamine, 70 mole percent isophthaloyl chloride and 30 mole percent 3,3-dimethyladipoyl chloride. This polymer was characterized by a high degree of surface hardness.

*Example 13*

N,N'-diphenyltrimethylenediamine was treated with a mixture consisting of 60 mole percent 1,4-cyclohexanedicarboxylic acid chloride and 40 mole percent succinyl chloride. The polymer was useful as a molding plastic.

Although this invention has been described in considerable detail with reference to certain preferred embodiments thereof, it will be understood that variations and modifications can be effected without departing from the spirit and scope of the invention as described hereinabove and as defined in the appended claims.

I claim:

1. A highly polymeric linear polyamide melting above about 150° C. and having an inherent viscosity of at least 0.4, being a polyamide of (1) at least one bifunctional dicarboxylic acid constituent comprising at least about 40 mole percent terephthalic acid and selected from the group consisting of mononuclear aromatic acids having from 8 to 20 carbon atoms and having their carboxyl radicals attached to a benzene ring, straight chain aliphatic acids having from 2 to 10 carbon atoms in a straight chain, symmetrical branched chain aliphatic acids having from 5 to 8 carbon atoms, and alicyclic acids having from 8 to 30 carbon atoms, and (2) at least one bifunctional diamine constituent of which at least 50 mole percent is a N,N'-diaryl diamine having the following formula:

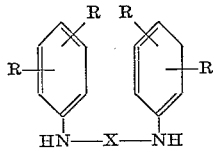

wherein each R represents a member selected from the group consisting of a hydrogen atom, an alkyl radical having from 1 to 4 carbon atoms, and a chlorine atom, said R substituents being attached to any available nuclear carbon atoms of the benzene rings; and wherein X is a bivalent organic radical having up to 4 oxygen atoms and represents a member selected from the group consisting of:

(a) —$(CH_2)_n$— wherein $n$ is from 2 to 6
(b) —$(CH_2)_m$—O—$(CH_2)_m$— wherein $m$ is from 2 to 3
(c) —$(CH_2)_2$—O—$(CH_2)_2$—O—$(CH_2)_2$—
(d) —$(CH_2)_p$—⟨benzene⟩—$(CH_2)_p$— wherein $p$ is from 1 to 2
(e) —$(CH_2)_2$—O—⟨benzene⟩—O—$(CH_2)_2$— and
(f) —$(CH_2)_2$—O—⟨benzene⟩—$C(CH_3)_2$—⟨benzene⟩—O—$(CH_2)_2$—

2. A polyamide as defined by claim 1 wherein said acid constituent (1) is terephthalic acid.
3. A polyamide as defined by claim 1 wherein said diamine constituent (2) is N,N'-diphenyl-α,α'-p-xylenediamine.
4. A polyamide as defined by claim 1 wherein said diamine constituent (2) is N,N'-diphenylethylenediamine.
5. A polyamide as defined by claim 1 wherein said diamine constituent (2) is N,N'-diphenyltetramethylenediamine.
6. A polyamide as defined by claim 1 wherein said diamine constituent (2) is N,N'-diphenylhexamethylenediamine.
7. A fiber of the polyamide as defined by claim 1.
8. A fiber of the polyamide as defined by claim 4.

References Cited by the Examiner
UNITED STATES PATENTS 2,953,548  9/1960  Schott _____ 260—78
3,094,511  6/1963  Hill et al. _____ 260—78
3,154,524  10/1964  Martinek _____ 260—78

WILLIAM H. SHORT, *Primarly Examiner.*

J. C. MARTIN, *Assistant Examiner.*